United States Patent [19]
Greenwald et al.

[11] Patent Number: 5,492,663
[45] Date of Patent: Feb. 20, 1996

[54] COORDINATED TEXTURE HARMONY BETWEEN FORMED MATERIAL AND MOLDED COMPONENTS

[75] Inventors: Pamela S. Greenwald, Englewood; Charles P. Albert, Vandalia; Allan R. Hartman, Centerville; Spidola Osborn; Paul A. Haines, both of Dayton, all of Ohio

[73] Assignee: General Motors Corporation, Detroit, Mich.

[21] Appl. No.: 263,362

[22] Filed: Jun. 20, 1994

[51] Int. Cl.⁶ .......................... B29C 33/40; B29C 51/10
[52] U.S. Cl. .......................... 264/154; 264/138; 264/220; 264/554
[58] Field of Search .................. 264/154, 554, 264/220, 226, 163, 138, 219, 225, 227

[56] References Cited

U.S. PATENT DOCUMENTS

| | | | |
|---|---|---|---|
| 3,562,049 | 2/1971 | Maher | 264/227 |
| 3,751,540 | 8/1973 | Prahl, Jr. et al. | 264/226 |
| 4,273,738 | 6/1981 | Spengler | 264/154 |
| 4,568,404 | 2/1986 | Herring | 264/554 |
| 5,204,033 | 4/1993 | Pearce et al. | 264/154 |

FOREIGN PATENT DOCUMENTS

| | | | |
|---|---|---|---|
| 3010426A1 | 5/1981 | Germany | 264/554 |
| 62-28224 | 2/1987 | Japan | 264/138 |

*Primary Examiner*—Robert B. Davis
*Attorney, Agent, or Firm*—Charles E. Leahy

[57] ABSTRACT

The invention provides a method by which the mold for a molded vehicle component can be engraved with a grain pattern to match the stretched grain pattern of an adjacent vehicle panel covered by a stretched vinyl sheet. According to the method, a grained vinyl sheet is stretched over a model of the vehicle panel so that the grained pattern of the vinyl is distorted. A portion of the vinyl sheet is then severed at the region to be occupied by the molded component and this severed portion of the vinyl sheet is used as a master for engraving the mold for the molded component.

2 Claims, 1 Drawing Sheet

COORDINATED TEXTURE HARMONY BETWEEN FORMED MATERIAL AND MOLDED COMPONENTS

The invention relates to a method for matching the grain texture pattern between a grained skin which is stretched over a three dimensional substrate panel and a molded component which is installed within an opening of the panel.

BACKGROUND OF THE INVENTION

It is well known in motor vehicle interiors to provide a vehicle panel such as the instrument panel by vacuum forming a skin over a rigid substrate panel. The instrument panel typically has a complex three dimensional shape to provide an aesthetically pleasing appearance as well as provide functionality via openings in the panel for the mounting of various components such as instrument housings, ashtrays, glove box door and filler panels. The formed skin is typically a sheet of vinyl material, a leather, or other suitable material. The components to be mounted within the openings are typically of molded plastic.

A harmonious appearance is provided via a texture pattern on the vinyl skin and a matching texture pattern on the molded component. The proper matching of the grained pattern between the components and the skin makes the dissimilar materials of the skin and the molded components visually indistinguishable.

The skin is provided by texturing the vinyl with the intended grain pattern in an extrusion process using a roller having the grain pattern engraved on it so that vinyl adopts the grain pattern when the roller makes contact with the vinyl.

A difficulty is caused in matching the grains between the formed skin and the molded component because forming and stretching the vinyl skin over the complex shape of the panel causes the grain to be stretched. For example, the stretching of the skin over an instrument panel may cause the vinyl to be stretched 6% in one region adjacent to the glove box door and 60% at a different region adjacent to the glove box door.

The prior art has either not compensated for the mismatch or has compensated for the mismatched stretch by applying a stretch factor (such as 30%) to the texture pattern of the molded component to attempt a better match of the molded component with the adjacent region of the formed skin. However, this grain matching method can only approximate a complete matching of the grain and leaves distortion which may be visible to the vehicle occupant.

It would be desirable to provide a new and improved method for more precisely matching the grain pattern between a grained skin stretched over a panel and a molded component installed within an opening of the panel.

Accordingly, the present invention provides a method by which the mold for each component can be engraved with a compensated grain pattern so that each of the molded components installations into the openings of the panel will have a grained pattern stretched to precisely match the stretched grain pattern of the formed skin portions surrounding the openings.

BRIEF DESCRIPTION OF THE DRAWINGS

These and other features, objects and advantages of the invention will be described in the appended specification in the description of the preferred embodiment and the appended drawings in which.

DESCRIPTION OF THE PREFERRED EMBODIMENT

Figure 1:
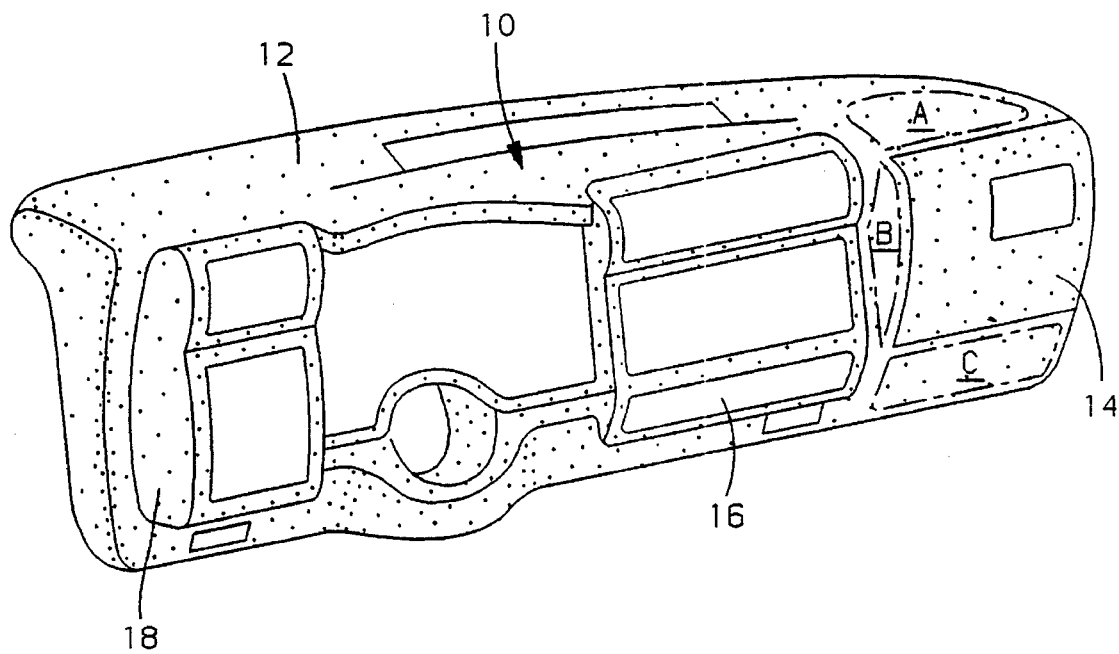
FIG. 1 is a perspective view of an instrument panel.

FIG. 1 of the drawing shows a vehicle instrument panel assembly 10 which is conventionally comprised of a formed vinyl skin 12 which has been installed over a molded plastic retainer substrate concealed beneath the skin 12 and not shown in the drawings. The instrument panel assembly 10 has a number of openings provided therein for mounting molded components such as the glove box door 14, ashtray 16 and filler panel 18.

The instrument panel 10 is manufactured by stretching the vinyl skin 12 over a model of the instrument panel, preferably by a vacuum forming process. The vinyl sheet material has a grained surface which is selected to provide a desired appearance. As the skin is stretched, the grain is distorted to varying degrees of non-uniform appearance at various locations on the panel. For example, the stretch in region A at the top of the panel may be 140%, the stretch in region B may be 6% and the stretch at region C may be 48%.

Figure 2:
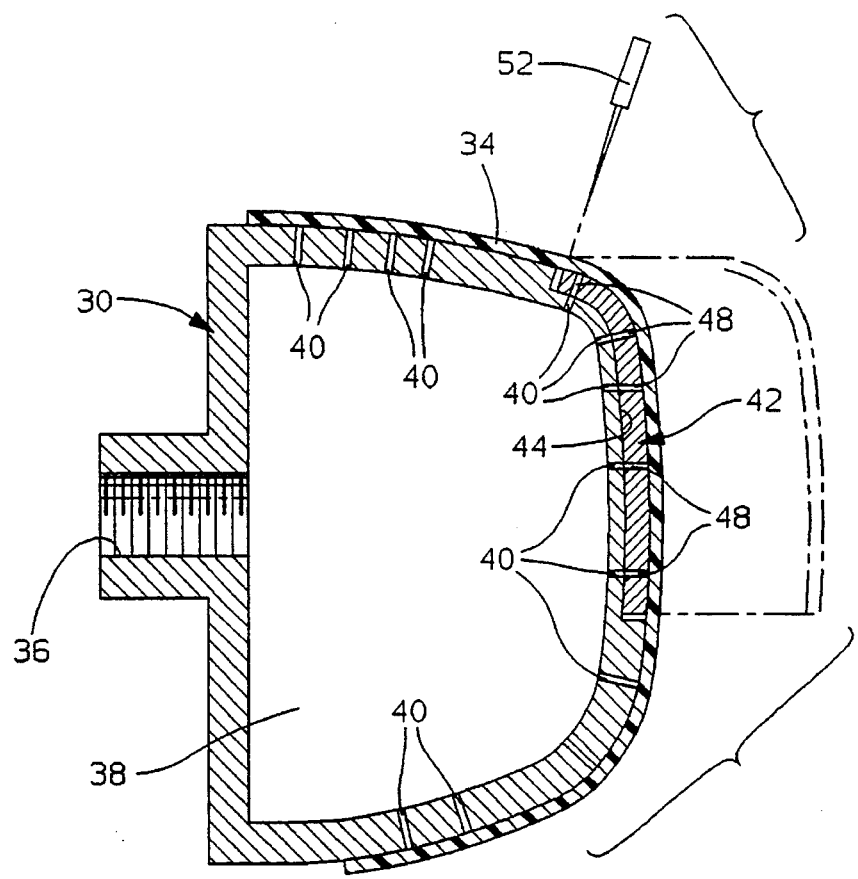
FIG. 2 is a cross sectional view taken through a tool used to practice the method of this invention.

The present invention provides a grain matching method which provides a precise matching of the grain. According to the method, a full size model 30 of the instrument panel is provided. FIG. 2 shows a cross section view through the model 30 at the centerline of the glove box door. The model 30 is preferably of aluminum construction and has an outer surface that simulates the shape of the instrument panel 10.

FIG. 2 shows a vinyl sheet skin 34 stretched over the model 30. The skin 34 is heated and then vacuum formed to the stretched condition by evacuating air through a pipe fitting 36 which communicates into a central chamber 38 of the model 30. A plurality of vacuum ports 40 are provided in the model 30 to sufficiently draw the vinyl sheet to the model 30. The model 30 also includes a removable portion 42 which simulates the shape of the glove box door and rests upon recessed wall 44 of model 30. The removable portion 42 has vacuum ports 48 provided therein which align with ports 40 of the recessed wall 44.

The vacuum formed stretching of the vinyl skin 34 over the model 30 will cause the vinyl to be stretched so that the grain pattern on the surface thereof will have varying degrees of stretch and distortion as discussed hereinbefore with reference to FIG. 1. The vacuum condition is held within the chamber 38 sufficiently long to permit the vinyl to be permanently stretched. After stretching, a knife shown at 52 is used to sever the vinyl skin all around the removable portion 42 and the vinyl skin 34 retains its stretched condition.

The stretched vinyl over the region of removable insert 42 is then used as a master for the engraving of the injection mold in which the glove box door 14 will be molded.

Accordingly, the glove box door molded in the injection mold will have a textured surface which incorporates stretch to varying degrees along the entire part to precisely match with the distorted grain pattern of the vinyl skin 34 stretched in varying degrees around the opening of the glove box door 14. This method is utilized for each of the molded components that interface with the vacuum form vinyl skin.

The model 30 of FIG. 2 can also be used as the production tool for preforming vinyl skins. This is accomplished by removing the removable portion 42 of the mold so that the vinyl skin will be drawn into the glove box door opening and rest upon the recessed wall 44.

Thus, it is seen that the invention provides a new and improved method for precise grain matching between a stretched material covered panel and a molded component installed within an opening of the covered panel. Furthermore, it will be understood that the grain matching method of this invention may be employed for instrument panels, door trim panels, consoles and other vehicle panels having a stretched skin covering and molded plastic components.

The embodiments of the invention in which an exclusive property or privilege is claimed are defined as follows:

1. A method for matching of a grain pattern between a grained vinyl skin vacuum stretched over a vehicle panel of predetermined shape and a grained molded plastic component of predetermined size and shape installed within an opening of the vehicle panel comprising the steps of:

selecting a vinyl sheet having a grain pattern of desired uniformity of appearance;

providing a model shaped to the shape of the vehicle panel and having a component portion thereof sized and shaped to simulate the size and shape of the molded plastic component;

stretching and securing the sheet vinyl over the model so that the grain pattern is distorted to varying degrees of non-uniform appearance at various locations on the vehicle panel and on the component portion simulating the molded components;

severing the vinyl sheet around the component portion to enable removal of the stretched vinyl sheet covering the component portion;

and engraving the mold for molding the molded component using the stretched vinyl sheet which has been severed around the component portion as a master for engraving the mold so that the molded component for installation into the opening of the vehicle panel has a grain pattern stretched to precisely match the stretched grain of the vinyl sheet surrounding the molded component.

2. The method of claim 1 further comprising the model having a removable portion simulating the shape of the molded plastic component so that removal of the removable portion from the model permits the model to be used as the production tool for stretching skins to cover the vehicle panel.

* * * * *